United States Patent
Tregnago et al.

(10) Patent No.: US 8,627,911 B2
(45) Date of Patent: Jan. 14, 2014

(54) ROLLER SHUTTER DEVICE FOR REGULATING THE AIR FLOW ENTERING INTO THE ENGINE COMPARTMENT OF A MOTOR VEHICLE

(75) Inventors: Roberto Tregnago, Orbassano (IT); Silvano Sandri, Orbassano (IT); Irene De Puri, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 128 days.

(21) Appl. No.: 13/214,301

(22) Filed: Aug. 22, 2011

(65) Prior Publication Data
US 2012/0091757 A1     Apr. 19, 2012

(30) Foreign Application Priority Data
Oct. 14, 2010   (EP) ...................................... 10187519

(51) Int. Cl.
*B60K 11/04* (2006.01)
(52) U.S. Cl.
USPC ........................................ 180/68.1; 180/68.6
(58) Field of Classification Search
USPC ................... 180/68.1, 68.2, 68.3, 68.4, 68.6; 296/193.1
See application file for complete search history.

(56) References Cited

U.S. PATENT DOCUMENTS

| | | | | |
|---|---|---|---|---|
| 1,528,575 A | * | 3/1925 | Schill | 165/41 |
| 3,762,489 A | * | 10/1973 | Proksch et al. | 180/68.1 |
| 4,186,817 A | * | 2/1980 | Bauer | 180/68.1 |
| 4,403,648 A | * | 9/1983 | Styok | 165/76 |
| 4,723,594 A | * | 2/1988 | Koehr et al. | 165/44 |
| 4,938,303 A | * | 7/1990 | Schaal et al. | 180/68.1 |
| 7,498,926 B2 | * | 3/2009 | Browne et al. | 340/425.5 |
| 8,316,974 B2 | * | 11/2012 | Coel et al. | 180/68.1 |
| 2006/0102399 A1 | | 5/2006 | Guilfoyle et al. | |
| 2010/0243352 A1 | * | 9/2010 | Watanabe et al. | 180/68.1 |
| 2011/0203861 A1 | * | 8/2011 | Charnesky et al. | 180/68.1 |

FOREIGN PATENT DOCUMENTS

| | | |
|---|---|---|
| CH | 291974 A | 7/1953 |
| DE | 3701584 A1 | 8/1988 |
| DE | 102006042627 A1 | 3/2008 |
| DE | 102008006020 A1 | 7/2009 |
| FR | 2738779 A1 | 3/1997 |

OTHER PUBLICATIONS

European Search Report, dated Mar. 8, 2011, for corresponding EP Application No. 10187519.3, completed on Feb. 28, 2011.

* cited by examiner

*Primary Examiner* — Frank Vanaman
(74) *Attorney, Agent, or Firm* — Heslin Rothenberg Farley & Mesiti P.C.; Victor A. Cardona, Esq.

(57) ABSTRACT

A roller shutter device is mounted in front of a radiator of a motor vehicle for regulating air flow entering into the engine compartment and traversing the radiator. The shutter is wound on a transverse roller which is received in an additional space defined in front of the radiator by a reinforcement crosspiece of the body having a substantially C-shaped outwardly projecting cross-section, which divides the front opening of the body into at least one lower opening and into at least one upper opening. The roller shutter is provided in one of said upper and lower openings; while an auxiliary shutter device which can be of the tilting louver type or even of the roller shutter type is associated to the other opening.

8 Claims, 6 Drawing Sheets

ROLLER SHUTTER DEVICE FOR REGULATING THE AIR FLOW ENTERING INTO THE ENGINE COMPARTMENT OF A MOTOR VEHICLE

CROSS REFERENCE TO RELATED APPLICATIONS

This application claims priority from European Patent Application No. 10187519.3 filed on Oct. 14, 2010, the entire disclosure of which is incorporated herein by reference.

The present invention relates to a roller shutter device for regulating the air flow entering into the engine compartment of a motor vehicle. More generally, the invention refers to motor vehicles of the type comprising a body with a front opening for the entry of an air flow into the engine compartment during the motion of the vehicle, at least one radiator, forming part of the engine cooling system, arranged adjacent to said front opening, and at least one roller shutter device, arranged in front of the radiator, for regulating the air flow which traverses said radiator during the motion of the vehicle.

An arrangement of the type described above is for example known from documents DE 37 01 584 A1 and FR 2 738 779 A1. Generally, the provision of a shutter device in front of the radiator allows regulating the air flow which traverses the radiator according to the actual need of cooling of the engine, thus, for example, completely preventing the entry of air into the engine compartment immediately after cold start of the engine. At the same time, in the conditions in which it is possible to eliminate or reduce the air flow entering into the engine compartment an improvement in the coefficient of aerodynamic drag of the vehicle is obtained. Roller shutter devices have the advantage, with respect to other conventional shutter devices, such as for example shutter devices with tilting louvers, lying in the fact that the opening for the passage of the air flow through the shutter device is entirely free of obstacles in the open condition of the shutter device.

The prior art solutions of roller shutter devices for regulating the air flow entering into the engine compartment however reveal the drawback of being relatively complex and especially of entailing a relatively large overall dimension in the longitudinal direction of the motor vehicle due to the need of providing space in which the shutter device is received when it is in the open condition. Such large overall dimension in the longitudinal direction makes the application of such devices complex, due to the little space available within the engine compartment. A solution as set forth in the preamble of claim 1 is known from DE 10 2006 042 627 A1. Other solutions of this kind are known from US 2006/102399 A1 and DE 10 2008 006020 A1.

The object of the present invention is that of overcoming the drawbacks of the prior art solutions, by providing a device that is simple and reliable and which at the same time can be housed without difficulties in the engine compartment of the motor vehicle.

With the aim of attaining such objects, the invention aims at providing a motor vehicle of the type indicated at the beginning of this description, characterised by the features of claim 1. As indicated, the device of the invention is of the roller shutter type, and such roller is arranged horizontally, according to a direction transverse with respect to the longitudinal direction of the motor vehicle. The roller shutter arrangement has the advantage of being extremely simple, even regarding the means for controlling the device, which can for example be constituted by a reversible rotation electric motor arranged at one end of the roller. Such arrangement is simpler and less bulky with respect to the prior art devices in which the shutter, instead of being wound on a roller, is made to slide towards a remote position with respect to the controlled opening, or in which the winding roller is arranged vertically. The solution with a shutter windable on a roller implies that in the opened condition the shutter is completely wound on the roller and has a not negligible dimension both in the vertical direction and in the longitudinal direction of the motor vehicle. However, in the case of the invention, this does not represent a drawback, in that the wound shutter is entirely contained in the abovementioned additional space defined in front of the radiator by the abovementioned reinforcement crosspiece.

The roller shutter device, and preferably also the auxiliary shutter device are mounted in an auxiliary framework which is removably connected to the radiator unit. Preferably, such auxiliary framework has a frame structure with two lateral walls which support the winding roller in rotation and which define lateral guides for the roller shutter.

In the closed condition of the device according to the invention, besides obtaining an improvement of the aerodynamic drag of the motor vehicle, an acoustic insulation of the engine compartment is also obtained. In order to improve such effect, the elements constituting the roller shutter and the auxiliary shutter device are preferably made of an acoustically insulating material.

Obviously, in the present description and in the claims that follow, the expression "winding roller" is used including both the case of an actual roller on which the shutter is wound and any equivalent arrangement, such as for example a shaft supporting two or more discs axially spaced from each other, on which the shutter is wound.

BRIEF DESCRIPTION OF THE DRAWINGS

Further characteristics and advantages of the invention shall be clear from the description that follows with reference to the attached drawings, purely provided by way of non-limiting example, wherein.

DETAILED DESCRIPTION OF THE INVENTION

With reference to the drawings, the front part of a motor vehicle according to the invention, which in the illustrated example is a commercial vehicle such as a van or the like, is indicated in its entirety with number 1. The vehicle 1 comprises a body made of metal sheet 2 which defines an engine compartment 3 at the front part of the motor vehicle and which has a front wall with an opening for the entry of an air flow into the engine compartment 3 during the motion of the motor vehicle.

Figure 1:
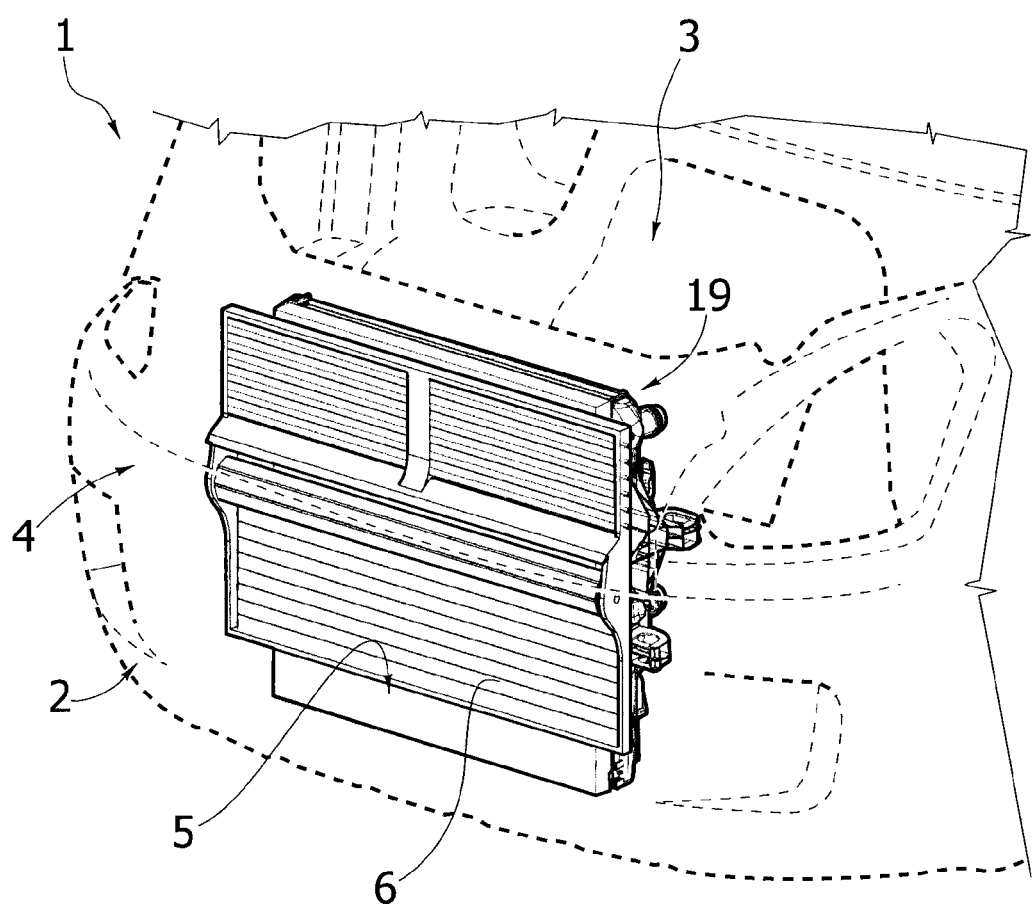
FIG. 1 is a partial perspective view of the front part of a vehicle according to the invention, in the specified example a commercial vehicle such as a van or the like, FIG. 2 is a perspective view of the unit comprising the radiator and the device according to the invention.
Figure 4:
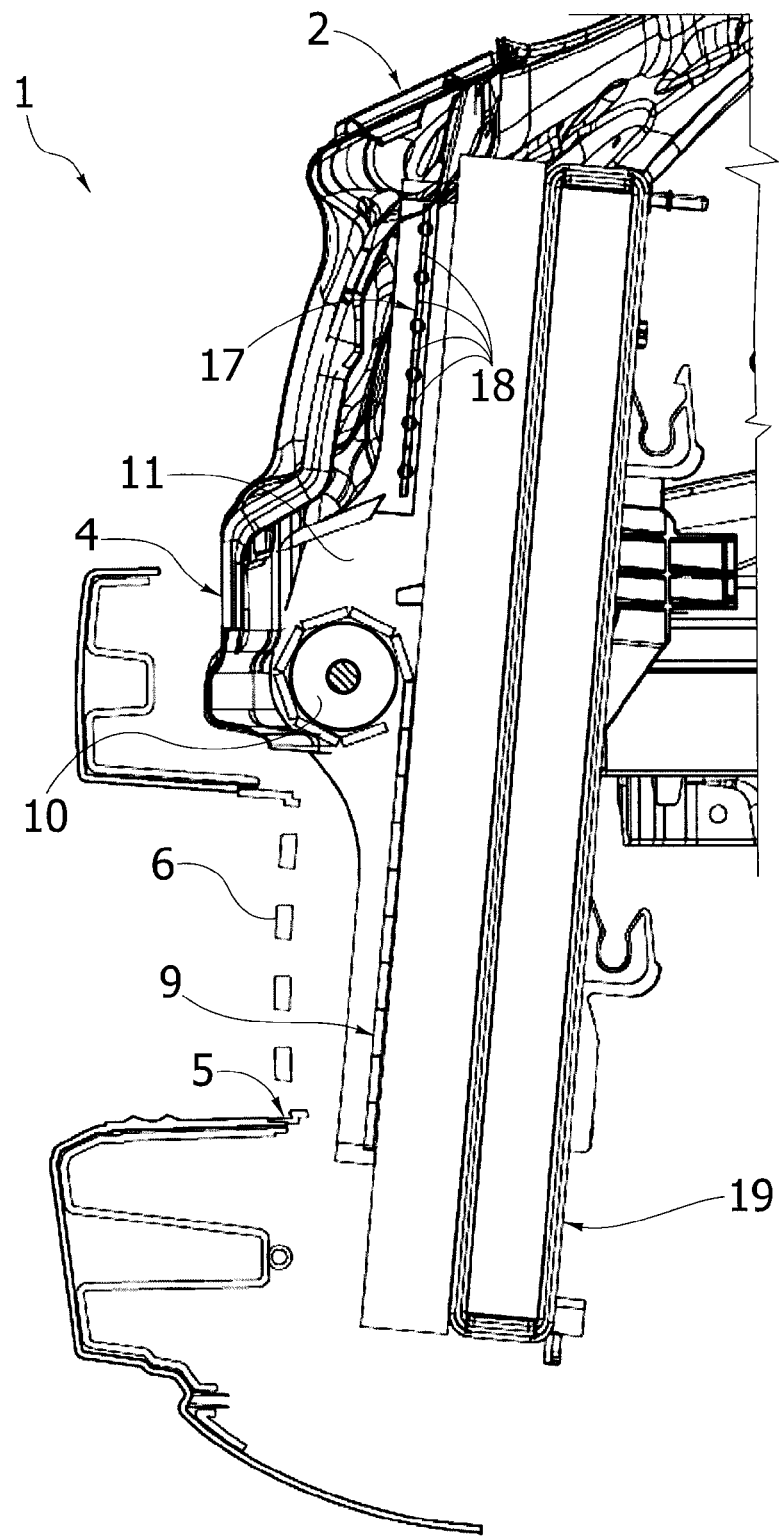
FIG. 4 is a sectional view in a vertical plane parallel to the longitudinal direction of the motor vehicle of the front part of the motor vehicle with the unit including the radiator and the device according to the invention.
Figure 5:
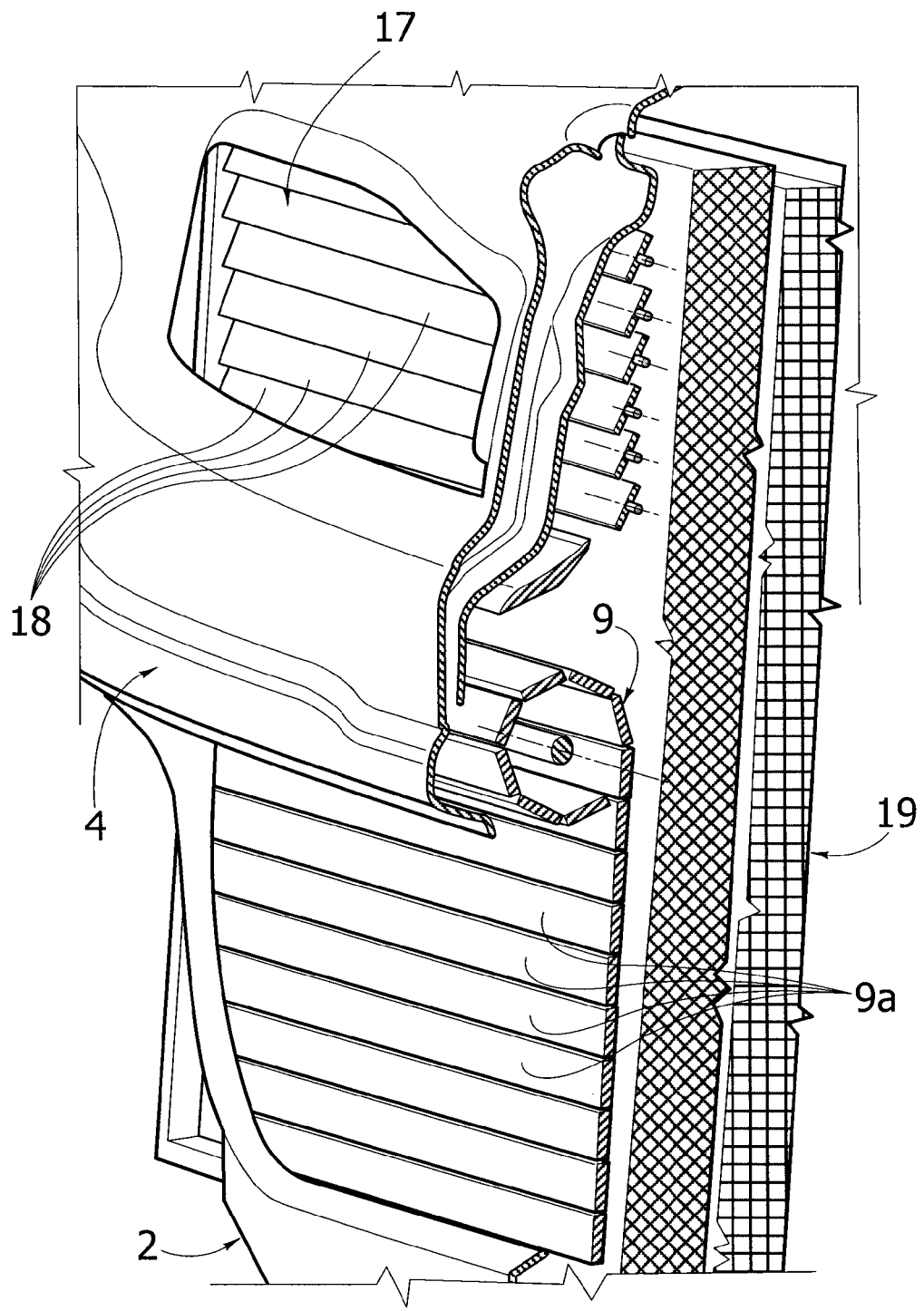
FIG. 5 is a partially sectional perspective view of the front part of the motor vehicle.
Figure 6:
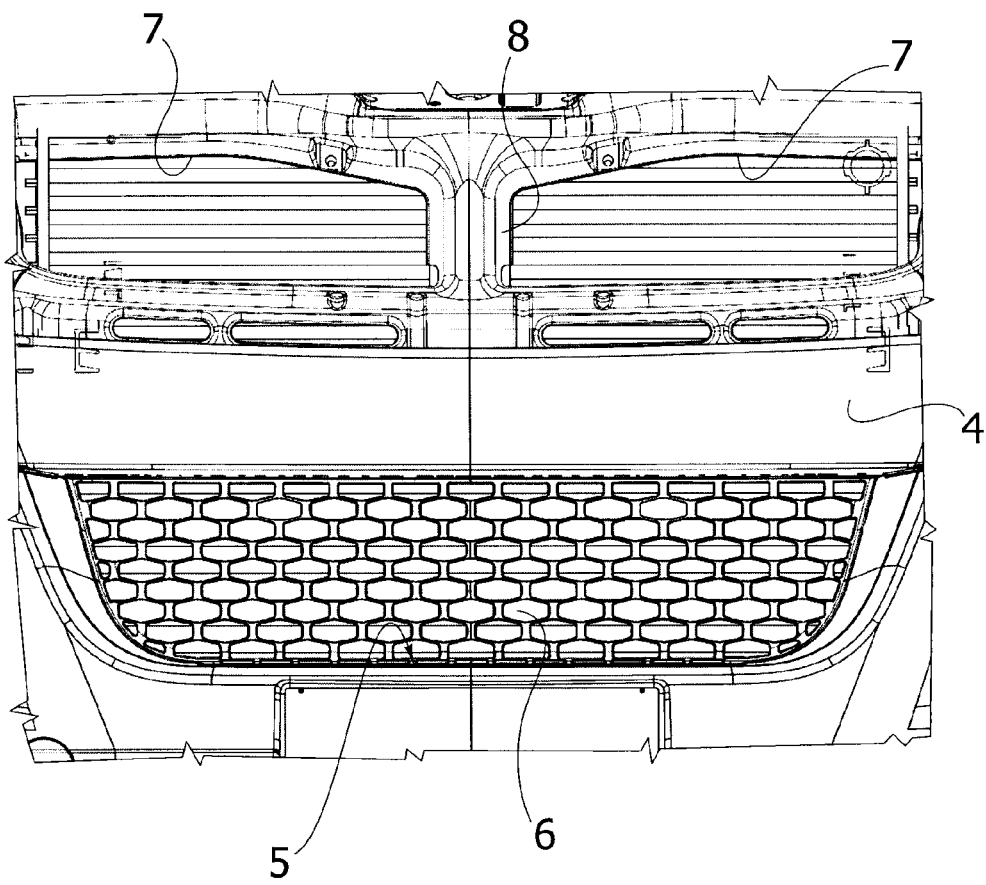
FIG. 6 is a partial front view of the motor vehicle of FIGS. 1, 4, 5.

At the front part thereof, the body 2 includes a reinforcement crosspiece 4 (see in particular FIGS. 1, 4, 5) which extends horizontally, transversely to the longitudinal direction of the motor vehicle, in such a manner to divide the front opening of the body into a lower opening 5 (also see FIG. 6) at which a grid 6 is mounted 6, and into an upper opening, in turn divided into two upper openings 7 by a vertical central upright 8 (FIG. 6).

The air flow through the lower opening 5 is controlled by a roller shutter device 9, comprising a shutter 9 constituted by blades 9*a* mutually articulated to each other and windable on a roller 10 received in an additional space 11 (FIG. 4) provided for in front of the engine compartment and the radiator due to the fact that the abovementioned reinforcement crosspiece 4 has a substantially C-shaped transverse section, projecting outwards.

The shutter device 9 is mounted in an auxiliary frame structure 12 (see FIGS. 2, 3) having two lateral walls 13 joined at the ends thereof by upper and lower crosspieces 14 and further joined to each other by an intermediate crosspiece 15 at two intermediate widened portions 13*a* of the lateral walls 13, used for rotatably mounting the winding roller of the shutter 9. The structure 12, in the case of the illustrated example, also has a stiffening vertical upright 16 which centrally joins the upper crosspiece 14 and the intermediate crosspiece 15.

The lateral walls 13, besides being used for mounting the winding roller of the shutter 9, also incorporate, at the lower part thereof, guide grooves or tracks (not illustrated) for the sides of the shutter 9. The drawings do not illustrate the means for controlling the winding roller of the shutter 9, preferably constituted by an electric motor of any known type, mounted at one end of the roller. The electric motor is of the reversible rotation type, so as to be able to control the displacement of the shutter 9 in the two directions between an entirely wound condition on the roller, and an extended condition in which the opening comprised between the roller, the two lateral walls 13 and the lower crosspiece 14 is entirely closed, thus preventing the passage of air through the corresponding lower opening 5 of the body of the motor vehicle and also insulating engine compartment acoustically.

In the upper part, the opening defined between the upper crosspiece 14, the intermediate crosspiece 15 and the two lateral walls 13 is controlled by means of an auxiliary shutter device 17 which—in the illustrated example—is of the known type comprising a plurality of tilting louvers 18 moveable between a position substantially parallel to the plane of the opening thereof, in which they close the opening, and a position substantially orthogonal to such opening, in which they make the section for passage of the air flow through such opening maximum.

Figure 2:
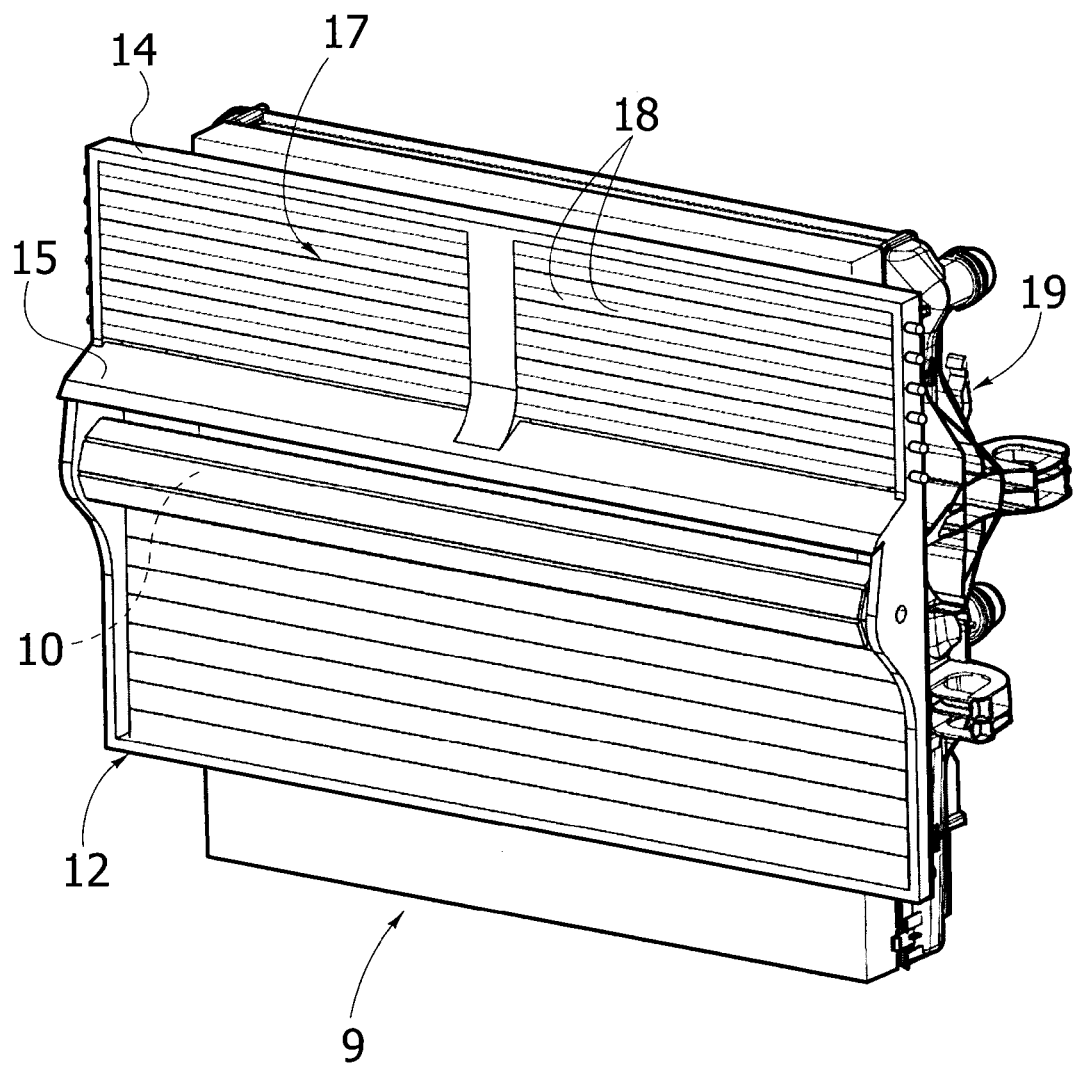
Figure 3:
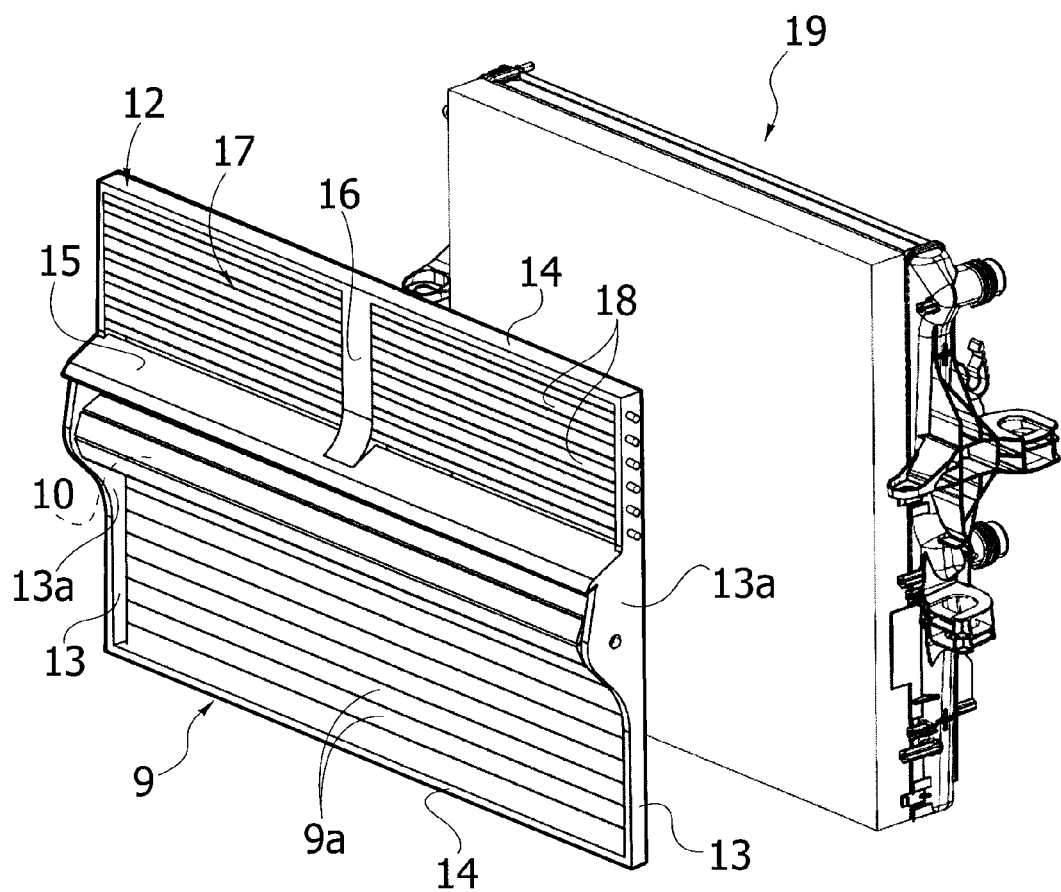
FIG. 3 is an exploded perspective view of the unit of the FIG. 2.

The structure 12 bearing the roller shutter device 9 and the auxiliary shutter device 17 with tilting louvers is removably fixed, through connection means of any type, to the radiator unit 19 part of the engine cooling system of the motor vehicle (see FIGS. 2 and 3).

The means for controlling the louvers 18 part of the auxiliary shutter device 17 are not described and illustrated herein in that they may be obtained in any known manner and in that the elimination thereof from the drawings makes the latter clearer and easier to understand. Typically, the louvers 18 have respective ends connected to each other by a parallelogram mechanism controlled, by means of a transmission of any type, by an electric actuator.

The roller shutter 9 may be of any known structure provided for such type of shutter. It comprises blades 9*a* connected to each other in an articulated manner so as to allow winding on the roller 10. In a preferred embodiment, the strips 9 are constituted by a fibrous synthetic material, with open or semi-open cells.

As indicated, the winding roller may be an actual roller, or any equivalent member, such as for example bearing several axially spaced wheels or discs on which the shutter is wound.

The device according to the invention allows controlling the air flow entering into the engine compartment during the motion of the vehicle through the abovementioned roller shutter device 9 and the shutter device 17 with louvers. The advantage of the roller shutter lies in the fact that it has an extremely simple and reliable structure, and it entails no problems regarding housing thereof in the engine compartment, due to the fact that in the wound condition it is comprised in the additional space defined by the cavity of the reinforcement crosspiece.

During operation, when cooling of the radiator is not required, for example after a cold starting of the engine, the shutter devices are kept closed, thus attaining the advantage of improving the coefficient of aerodynamic resistance of the vehicle, given that the air flow is eliminated through the engine compartment of the vehicle. At the same time, sound insulation of the engine compartment is obtained. With the progressive heating of the engine, the shutter devices are gradually opened, up to the maximum open condition, when the maximum cooling of the radiator is required.

Obviously, also the auxiliary shutter device provided at the openings arranged above the reinforcement crosspiece 4 could be a roller shutter device. Preferably, in this case, the two roller shutters are wound and unwound simultaneously by the same roller, overlapped with respect to each other in the wound condition on the roller.

Obviously, without prejudice to the principle of the invention, the construction details and the embodiments may widely vary with respect to what has been described and illustrated purely by way of example, without departing from the scope of protection of the present invention.

What is claimed is:

1. Motor vehicle, comprising a body with a front opening for the entry of an air flow into the engine compartment of the motor vehicle during the motion of the motor vehicle, at least one radiator forming part of the engine cooling system, arranged adjacent to said front opening, and at least one roller shutter device for regulating the air flow through such opening, wherein said vehicle further comprises a reinforcement crosspiece joined to the body and having a substantially C-shaped outwardly projecting cross-section bounding a cavity located in front of the radiator, wherein the roller shutter device comprises a shutter windable on a transverse horizontal roller rotatably mounted within said cavity at the rear of the reinforcement crosspiece, wherein said front opening is divided into at least one lower opening and into at least one upper opening separated by said reinforcement crosspiece, and in that in an unwound condition thereof the roller shutter device closes one of said upper and lower openings, while an auxiliary shutter device is associated to the other opening, wherein the roller shutter device and the auxiliary shutter device are borne by an auxiliary structure connected to a front part of the radiator, said auxiliary structure directly contacting and being connected to said front part of said radiator and avoiding contact with a remainder of the vehicle;

wherein said auxiliary structure comprises two lateral walls joined by an upper crosspiece and by a lower crosspiece, said lateral walls having intermediate portions for rotatably supporting the roller of the roller shutter device, said intermediate portions being joined by an intermediate crosspiece, said lateral walls further being provided with guide means for the sides of the roller shutter.

2. Motor vehicle according to claim 1, wherein said auxiliary shutter is a louver shutter with tilting louvers.

3. Motor vehicle according to claim 1, wherein said auxiliary shutter is a roller shutter device.

4. Motor vehicle according to claim 3, wherein the two roller shutters have a common winding roller.

5. Motor vehicle according to claim 1, wherein the roller shutter and the auxiliary shutter device are made of an acoustically insulating material.

6. Motor vehicle according to claim 2, wherein the roller shutter and the auxiliary shutter device are made of an acoustically insulating material.

7. Motor vehicle according to claim 3, wherein the roller shutter and the auxiliary shutter device are made of an acoustically insulating material.

8. Motor vehicle according to claim 4, wherein the roller shutter and the auxiliary shutter device are made of an acoustically insulating material.

* * * * *